United States Patent [19]

Chao

[11] Patent Number: 4,859,217

[45] Date of Patent: Aug. 22, 1989

[54] PROCESS FOR SEPARATING NITROGEN FROM MIXTURES THEREOF WITH LESS POLAR SUBSTANCES

[75] Inventor: Chien C. Chao, Millwood, N.Y.

[73] Assignee: UOP

[21] Appl. No.: 67,820

[22] Filed: Jun. 30, 1987

[51] Int. Cl.$^4$ .............................................. B01D 53/04
[52] U.S. Cl. ............................................ 55/68; 55/75
[58] Field of Search ................ 55/68, 75, 389; 502/79

[56] References Cited

U.S. PATENT DOCUMENTS

| | | | |
|---|---|---|---|
| 2,882,244 | 4/1959 | Milton | 502/79 X |
| 3,140,931 | 7/1964 | McRobbie | 55/68 X |
| 3,140,933 | 7/1964 | McKee | 55/68 |
| 3,313,091 | 4/1967 | Berlin | 55/75 X |
| 3,780,125 | 12/1973 | Takacs | 502/79 X |
| 3,882,184 | 5/1975 | Rosback | 502/79 X |
| 4,415,481 | 11/1983 | Smolin | 502/79 X |
| 4,481,018 | 11/1984 | Coe et al. | 55/75 X |
| 4,483,937 | 11/1984 | Liu | 502/79 X |
| 4,557,736 | 12/1985 | Sircar et al. | 55/75 X |

FOREIGN PATENT DOCUMENTS 26246  11/1965  Japan ..................................... 55/75

OTHER PUBLICATIONS

Howard S. Sherry, "The Ion–Exchange Properties of Zeolites. I. Univalent Ion Exchange in Synthetic Faujasite", J. of Physical Chem., vol. 70, No. 4 (4/1966), pp. 1158–1168.

Primary Examiner—Robert Spitzer
Attorney, Agent, or Firm—Richard G. Miller

[57] ABSTRACT

The highly lithium exchanged forms of zeolite X, particularly the low silica forms of zeolite X which contain more than ninety equivalent percent lithium cations, have been found to exhibit extraordinary capacities and selectivities for nitrogen adsorption. Such adsorbents are to a surprising degree effective in separating nitrogen from gas streams such as air and mixtures of nitrogen with less polar substances such as hydrogen, argon and methane. Pressure swing adsorption separation process are well suited to take advantage of the exceptional properties of these absorbents.

7 Claims, 2 Drawing Sheets

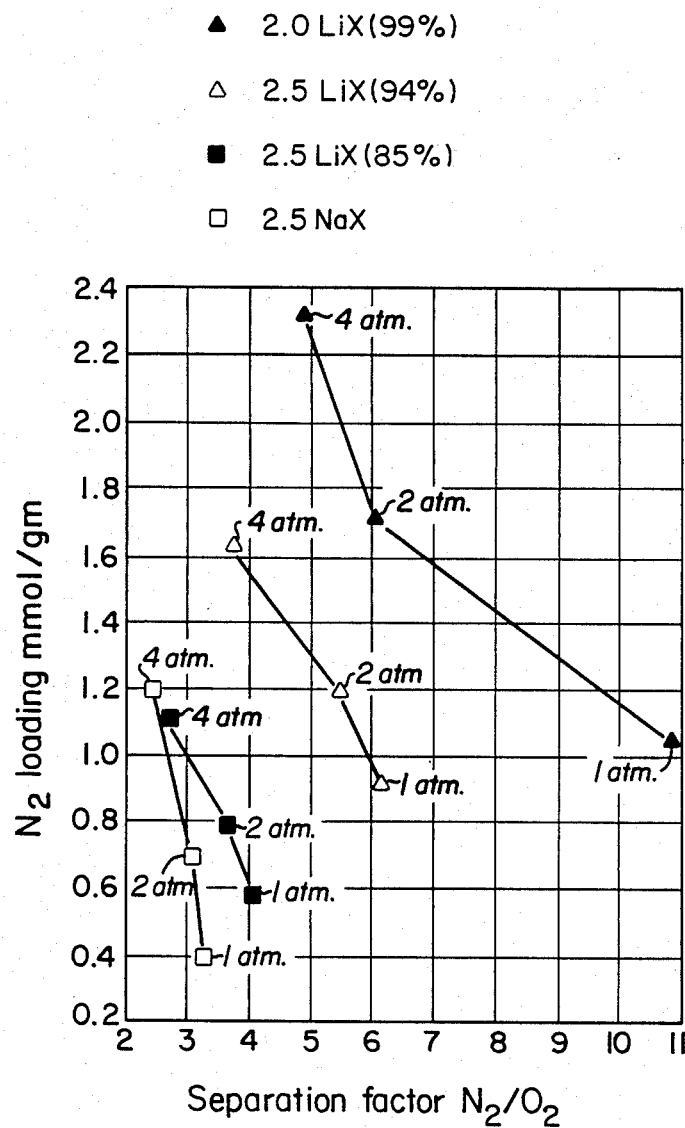
F I G. 1

PROCESS FOR SEPARATING NITROGEN FROM MIXTURES THEREOF WITH LESS POLAR SUBSTANCES

FIELD OF THE INVENTION

The present invention relates to processes involving the selective adsorption of nitrogen from gas streams. More particularly, it relates to the use of a highly exchanged lithium form of zeolite X having a low silica content for recovering nitrogen from gas streams such as air.

BACKGROUND OF THE INVENTION

Separations of nitrogen from admixture with other gases such as oxygen, hydrogen and argon are important industrial process. In such processes the objective may be either to obtain a product gas enhanced in nitrogen or a product from which nitrogen as an undesired constituent has been removed. One of the more important of these commercial scale processes is the separation of air to obtain nitrogen and oxygen. In 1985, six hundred forty-seven billion cubic feet of nitrogen and 380 billion cubic feet of oxygen were produced in the United States alone.

Most of the nitrogen and oxygen derived from air is produced by cryogenic rectification in which air is cooled to temperatures near the normal boiling point of the components and treated in fractionation columns, usually requiring a large number of liquid-gas contact means such as perforated trays. The significant capital costs of the cryogenic separation systems is justified only where large quantities of the product are required, such as oxygen in the manufacture of steel. For operations with smaller requirements, oxygen and nitrogen can also be produced by pressure swing adsorption (PSA) processes. In PSA processes, compressed air is pumped through a fixed bed of an adsorbent exhibiting an adsorptive preference for one of the main constituents whereby an effluent product stream enhanced in the non-adsorbed (or lesser adsorbed) constituent is obtained. Compared to the cryogenic processes, PSA air separation processes require relatively simple equipment and are relatively easy to maintain. PSA processes, however, have lower product recovery and higher energy consumption than the cryogenic processes. For these reasons, improvements in the adsorption processes remain important goals. One principal means of improvement is the discovery and development of better adsorbents.

The Prior Art

The use of crystalline zeolitic molecular sieves as selective adsorbents for nitrogen, particularly from air, is well known in the art. The general class of zeolites having pore diameters of at least 4.6 Angstroms was proposed by McRobbie in U.S. Pat. No. 3,140,931 for the separation of oxygen-nitrogen mixture. The use of the particular zeolite species zeolite X containing as cations at least one member of the group consisting of strontium, barium or nickel was proposed as a nitrogen adsorber in the separation of oxygen-nitrogen mixtures by McKee in U.S. Pat. No. 3,140,932. The relative merits of the various alkali metal cation forms of zeolites, including zeolite X were discussed by McKee in U.S. Pat. No. 3,140,933, and the lithium cation form was found to be superior for the selective adsorption of nitrogen from air. This superiority, however, was based on a comparison with a sodium zeolite X adsorbent whose adsorbent properties were inferior to other sodium zeolite X materials then being introduced into the art for nitrogen separation. Consequently lithium zeolite X has never heretofore been utilized commercially in nitrogen separation processes, and its true potential as a nitrogen adsorbent has not been appreciated. Evidence of this fact is seen in the disclosure of U.S. Pat. No. 3,313,091 (Berlin) which issued three years after the McKee patent wherein lithium zeolite X was found to be inferior to the sodium cation form of the same zeolite both for nitrogen and for oxygen adsorptive capacity at 70° F. and at pressures of from 5 to 30 psig. Much more recently Sircar et al. have proposed, U.S. Pat. No. 4,557,736, a binary ion exchanged form of Zeolite X was a preferred adsorbent for the adsorption of nitrogen from air. From 5 to 40 percent of the available cation sites are occupied $Ca^{++}$ ions, and between 60 and 95 percent are occupied by $Sr^{++}$ ions in accordance with the Sircar et al. discovery. Coe et al. have proposed, U.S. Pat. No. 4,481,018, that provided activation conditions are properly maintained, the polyvalent cation forms of faujasite-types of zeolites having Si/Al framework ratios of from 1 to 2, particularly the $Mg^{++}$, $Ca^{++}$, $Sr^{++}$ and $Ba^{++}$ cation forms, are superior adsorbents for nitrogen from air.

SUMMARY OF THE INVENTION

It has now been discovered that the lithium cation forms of zeolite X in which the framework $Si/Al_2$ molar ratio is from about 2.0 to about 3.0, preferably from 2.0 to 2.5, and in which at least about 88 percent, preferably at least 90 percent and more preferably at least 95 percent, of the $AlO_2^-$ tetrahedral units are associated with lithium cations exhibit an extraordinary capacity and selectively toward the adsorption of nitrogen from gas streams containing less polar or less polarizable molecular species such as oxygen. This LiX adsorbent represents a considerable improvement in nitrogen separation and purification processes such as PSA air separation processes as well as separations of nitrogen from admixture with hydrogen, argon and the like. These adsorbents are, because of their exceptional increase in nitrogen capacity with increasing nitrogen partial pressures in the temperature range of 15° C. to 70° C., particularly 20° C. to 50° C., especially suitable for PSA nitrogen separation processes operating under those temperature conditions and at pressures of from 50 torr to 10,000 torr.

DESCRIPTION OF THE DRAWINGS

FIG. 1 is a graph showing the binary nitrogen loading and separation factors of three different lithium zeolite X compositions of this invention and also the same parameters for a sample of sodium zeolite X.

DETAILED DESCRIPTION OF THE INVENTION

Figure 2:
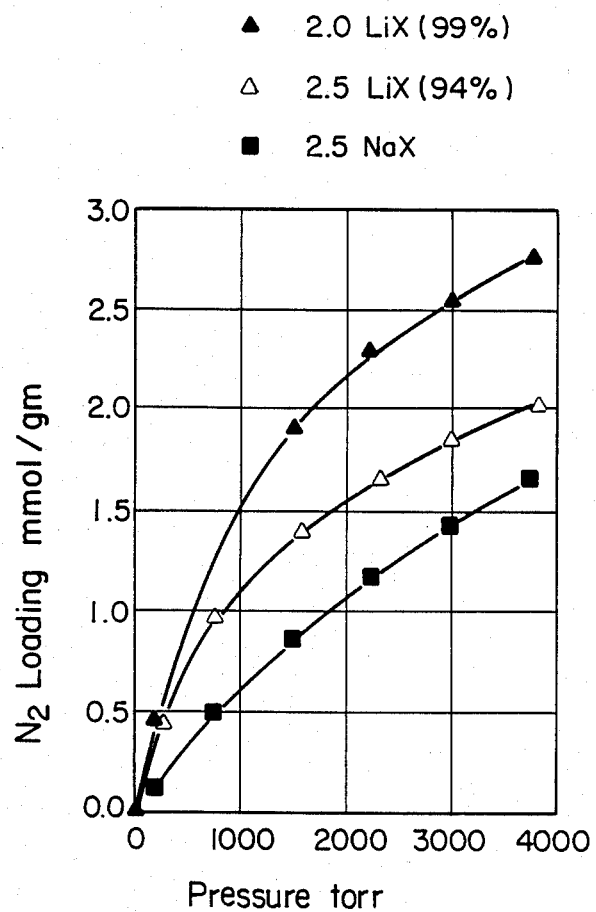
FIG. 2 is a graph showing a comparison of the nitrogen isotherms at about 23° C. of two adsorbents of the present invention and a sodium zeolite X of the prior art.

The present invention is based on the discovery that the lithium cation exchanged form of zeolite X exhibits adsorption properties with respect to nitrogen which at very high levels of exchange are totally unpredictable from the trend of the data obtained from LiX samples in which 86 equivalent percent or less of the cations are lithium and the remainder are principally sodium cations. A further discovery is that an increase in the relative proportion of $AlO_2^-$ tetrahedral units in the zeolite X framework from 44.4% of the total $TO_2$ units to 50% of the $TO_2$ units, with a corresponding increase in $Li^+$ ions, i.e. the same equivalent percent of $Li^+$ ions in each case, there is also an increase in the adsorption capacity and selectivity of the zeolite for nitrogen which is far greater than would be expected from the increased number of cations. These improvements are demonstrated by the data appearing hereinafter.

In preparing the adsorbent bodies from which the adsorption data was obtained, two types of zeolite X starting materials were employed, one having a $SiO_2/Al_2O_3$ ratio of 2.5 and the other having a $SiO_2/Al_2O_3$ ratio of about 2.0. The 2.5 NaX was synthesized hydrothermally at a temperature of about 100° C. using sodium silicate and sodium aluminate and water as the reagents in accordance with the teachings of U.S. Pat. No. 2,882,244, issued Apr. 14, 1959 to R. M. Milton, from a reaction mixture having the following composition in terms of molar oxide ratios:

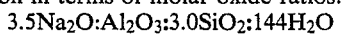
$3.5Na_2O:Al_2O_3:3.0SiO_2:144H_2O$

The zeolite X having a $Si/Al_2$ ratio of 2.0 was synthesized in the mixed sodium-potassium form in accordance with the procedure described below, the synthesis procedure forming no part of the present invention. In 267 grams of an aqueous 50% NaOH solution was dissolved 208 grams of $Al(OH)_3$ using heating and stirring to form solution (a). Solution (b) was prepared by dissolving 287 grams of 85.3% KOH pellets in 1000 grams of water and then mixing the solution thus formed with 671 grams of an aqueous 50% NaOH solution. Solution (a) was slowly added to solution (b) to form solution (c) which was cooled to 4°–12° C. Solution (d) was prepared by diluting 453.25 grams of 40-grade sodium silicate (9.6% $Na_2O$; 30.9% $SiO_2$) with 1131.7 grams of water. The cooled solution (c) was then added to solution (d) in a blender and mixed at low speed for 3 minutes. The cooling and avoiding the creation of undue amounts of mechanical energy in the final mixing are important to the preparation of a high quality product. Gelling should not occur until after about 4 minutes. The gel is aged at 36° C. for 2–3 days and digested at 70° C. for 16 hours. The zeolite crystals were then isolated by filtration and the filter cake rinsed with aqueous NaOH solution (pH=12) in an amount equal to seven times the volume of the mother liquor. The rinsed product was reslurried in 4 liters of NaOH solution (pH=10) and then recovered by filtration and rinsed with water. The reslurry procedure was repeated two more times and the isolated product dried in air. The dried product was slurried in 100 ml. of 1% NaOH solution and maintained in the slurry at 90° C. for 21 hours. After filtration the cake was reslurried with 1000 ml. of NaOH solution (pH=12) at 60° C. for 30 minutes and filtered. The reslurry process was repeated twice more and then the solids were recovered by filtration and washed with aqueous NaOH solution (pH=9) and dried in air.

Using the 2.5 NaX as prepared above, a zeolite "preform" agglomerate was produced in accordance with the following procedure: The starting zeolite crystals were washed with an aqueous caustic solution having a pH of 12 and consisting essentially of sodium hydroxide and water, and then washed with water to a pH of 9. The washed zeolite crystals were then admixed with Avery clay, a commercially available kaolin-type clay, in proportions of 80 weight percent zeolite and 20 weight percent clay. The zeolite-clay mixture was then combined with sufficient water to produce an extrudable mass with sufficient green strength for the extruded pellets to undergo the subsequent firing step in which the kaolinitic clay was converted to an active meta-kaolin form at a temperature of about 650° C. for about 1 hour. After firing the bonded agglomerates were cooled and immersed and digested in an aqueous caustic solution at about 100° C. to convert the bulk of the metakaolin to zeolite crystals, mainly zeolite X crystals. The digested agglomerates were removed from the caustic digestion solution, again washed with a fresh aqueous NaOH solution having a pH of 12 and finally washed with water to pH of 9–10 and dried in air. The dried product pellets were broken and sieved to form particles having a size of 16×40 mesh. A first portion of the mesh particles were activated by heating in vacuum at a temperature of 375° C. for a period of about 2.5 hours. The activation was carefully carried out in this manner so that the zeolite NaX crystals were not subjected to undue hydrothermal abuse by the steam formed from the occluded and/or adsorbed water. The activated sample is identified hereinafter as sample "2.5 NaX."

A second portion of the unactivated mesh particles was subjected to an ion-exchange procedure whereby the particles were contacted in a glass column by a stream of a 1.0 Molar aqueous lithium chloride, adjusted to a pH of 9.0 using LiOH, at a temperature of 80° C. A quantity of the lithium chloride solution was employed such that the zeolite particles were contacted with a four-fold stoichiometric excess of lithium ions over a period of about 19 hours. The ion-exchange solution leaving the column was not recycled. The resulting ion-exchanged product was washed with water, having its pH adjusted to 9 with LiOH, and found to be 94% ion-exchanged and is identified hereinafter as sample No. 1".

Other portions of Sample 2.5 NaX were ion-exchanged using the column technique described above with an aqueous lithium chloride solution (pH=9, adjusted with LiOH) using either less or greater than a four-fold amount of LiCl so that products having various amounts of lithium cations were formed. By this procedure materials were obtained in which the $Li^+$ cation content represented from 72 to 100 equivalent percent of the overall cation population. These materials are identified hereinafter as samples Nos. 1 and 2, respectively.

With respect to the ion-exchanged zeolite compositions of Sample Nos. 3–16 in Table I, an array of LiX compositions having from 72 to 100 equivalent percent lithium cations was generated using the column ion exchange procedure similar to that employed in the preparation of samples 1 and 2, supra. The lithium ion exchange of zeolite X is a difficult process. The efficiency of the process is strongly dependent upon column dimensions and packing conditions. In general, we have found that a three-foot column and a 12-fold stoichiometric excess of lithium salt is sufficient to produce a product having a lithium ion content of 94 equivalent percent or greater. In preparing samples Nos. 3–16, the unactivated zeolite X particles were ion-exchanged in a glass column using streams of lithium chloride solution of 0.1 to 3.0 molar concentration adjusted to a pH of about 9 using LiOH. The quantity of LiCl solution was utilized in each case to provide between a 4- to 12-fold excess of lithium ions over a period of three to nineteen hours.

Using the low-silica 2.0 NaKX sample prepared by the method described hereinabove, the alkali metal cations were replaced by lithium cations to the extent of greater than about 99 equivalent percent by ion-exchange with an aqueous lithium chloride solution (pH=9, using LiOH). This material, in powder form, is identified hereinafter as sample "2.0 LiX (99%)."

Each of the above-identified samples was tested in one or more ways to determine its adsorption properties with respect to nitrogen alone or with respect to nitrogen in admixture with other and less polar molecular species.

Using a conventional McBain adsorption system, thirteen of the samples, each activated by heating under vacuum for 16 hours at 375° C., were tested for nitrogen sorption capacity of pure nitrogen at a $N_2$ pressure of 700 torr at ambient room temperature, i.e., ~23° C. Particulars of the ion exchange treatment, the agglomerate particle sizes, the cation population of the individual zeolites tested and the results of the adsorption testing are set forth in tabular form below.

TABLE I

| Sample No. | Ion Exchange Conditions | Agglom. Form | Li+ cations Equiv.-% | Na+ cations Equiv.-% | $N_2$-loading, wt.-% 23° C. | 0° C. |
|---|---|---|---|---|---|---|
| 2.5 Nax | None | | 0 | 100 | 1.24 | |
| 1. | 4-fold excess of 1. M LiCl @ 80° C., 19 hours; pH = 9 | 16 × 40 mesh | 94 | 6 | 2.31 | 3.56 |
| 2. | 4-fold excess of 0.12 M LiCl @ 80° C.; pH = 9 | 8 × 12 beads | 85 | 15 | 1.46 | |
| 3. | " | " | 81 | 19 | 1.05 | |
| 4. | " | " | 80 | 20 | .99 | |
| 5. | >4-fold excess of 1.0 M LiCl @ 85° C. cold water wash* | " | 94 | 6 | 2.56 | |
| 6. | " | " | 96 | 4 | 2.53 | |
| 7. | 4-fold excess of 0.1 M LiCl; @ 85° C. for 3 hours pH = 9 with added LiOH; hot water wash | | | | | |
| 8. | 4-fold excess of 0.6 M LiCl; washed with 0.01 M LiCl at pH = 9 | " | 83 | 17 | 1.35 | |
| 9. | 10-fold excess of 1.0 M LiCl; pH = 9; hot water wash for 1 hour | " | 86 | 14 | 1.37 | |
| 10. | 4-fold excess of 0.46 M LiCl @ 80° C. | " | 93 | 7 | 2.22 | |
| 11. | 6-fold excess of 1.0 M LiCl @ 90° C.; pH = 9 | 20 × 40 beads | 90 | 10 | 1.80 | |
| 12. | " | 8 × 12 beads | 97 | 3 | 2.68 | |
| 13. | Prewash with 1% NaOH, 6-fold 2.0 M LiCl; pH = 9 | " | 72 | 28 | 0.88 | |
| | | | 100 | 0 | 2.73 | 1.51 |
| 14. | 10-fold excess of 1.0 M LiCl; pH = 9 | 20 × 40 beads | 96 | 4 | 2.31 | 4.00 |
| 15. | 12-fold excess of 3.0 M LiCl; pH = 9 | 8 × 12 beads | 96 | 4 | 2.40 | 3.33 |
| 16. | 12-fold excess of 2.78 M LiCl @ 100° C.; pH = 9.5; wash with 0.02 M LiCl at pH = 9.5 | " | 98 | 2 | 2.62 | 2.67 |
| 17. | 6-fold excess of 2.0 M LiCl | " | 86 | 13 | 1.72 | |

*included a caustic digestion treatment with a 1.0% NaOH aqueous solution prior to ion exchange
700 torr $N_2$ pressure The binary adsorption properties of lithium-exchanged NaX samples having different levels of ion exchange and different Si/Al$_2$ molar ratios were compared with each other and with the unexchanged NaX starting material. For purposes of this determination, a synthetic air stream (20% oxygen, 80% nitrogen) was passed through a packed bed containing the test sample at the selected pressures of 1, 2 and 4 atmospheres until adsorption equilibrium was obtained, i.e., the effluent gas stream was the same composition as the feedstock stream. The adsorption bed was then desorbed with a stream of helium and the desorbate collected and analyzed using a gas chromatograph. The adsorption separation factor $\alpha$(N/O) was then calculated using the formula:

$$\alpha(N/O) = \frac{[N_2] \text{ adsorbed} \times [O_2] \text{ feedstock}}{[O_2] \text{ adsorbed} \times [N_2] \text{ feedstock}}$$

wherein [N$_2$] and [O$_2$] are in terms of volume concentrations in the two phases. The data obtained are set forth in tabular form in Table II below and in FIG. 2 of the drawings.

TABLE II

| Sample No. | Pressure, Atm. | N$_2$Loading, mmol/qm ads. | Separation Factor V(N/O) |
|---|---|---|---|
| 2.5 NaX | 1 | 0.2 | 3.2 |
| 2.5 NaX | 2 | 0.7 | 3.1 |
| 2.5 NaX | 4 | 1.2 | 2.5 |
| 2.5 LiX (85%) | 1 | 0.55 | 4.0 |
| 2.5 LiX (85%) | 2 | 0.80 | 3.6 |
| 2.5 LiX (85%) | 4 | 1.1 | 2.7 |
| 2.5 LiX (94%) | 1 | 0.93 | 6.2 |
| 2.5 LiX (94%) | 2 | 1.20 | 5.5 |
| 2.5 LiX (94%) | 4 | 1.62 | 3.8 |
| 2.0 LiX (99%) | 1 | 1.03 | 10.9 |
|  | 2 | 1.70 | 6.0 |
|  | 4 | 2.30 | 4.9 |

Using a commercial Sartorius microbalance, the single component N$_2$ isotherms at room temperature were determined for samples of highly exchanged LiX, moderately exchanged LiX and the NaX starting material. The data obtained is shown in graphic form in FIG. 1 of the drawings. These data clearly demonstrates the superiority at room temperature of the highly exchanged LiX over prior known lithium exchanged NaX in which the lithium cation content was 86 equivalent percent or less, not only in capacity for nitrogen at any given pressure, but also in terms of delta loadings which are so important in PSA nitrogen processes. These delta loading values for operation between 150 and 1500 torr taken from FIG. 2 and calculated in terms of weight-% are shown in tabular form below:

| Sample | Form | Loading at 150 torr Weight-% | Loading at 1500 torr Weight-% | Δ Loading |
|---|---|---|---|---|
| 2.5 NaX | 16 × 40 mesh | 0.29 | 2.34 | 2.05 |
| 2.5 LiX (94%) | 16 × 40 mesh | 0.83 | 3.81 | 2.98 |
| 2.0 LiX (99%) | Powder | 1.22 | 5.31 | 4.09 |

The foregoing data support the proposition that the nitrogen adsorption loading of LiX and the lithium content of the zeolite have a most unusual correlation. As the data of Table I show, at 23° C. and 700 torr, the nitrogen loading of an 80% lithium exchanged NaX zeolite is essentially the same as a NaX zeolite of the same Si/Al$_2$ ratio containing no lithium cations. But if the lithium exchange level is increased from 80% to 99%, the nitrogen loading increased from 1 weight-% to 2.7 weight-%. At 0° C., the 99% lithium exchange NaX adsorbs about 4.0 weight-% nitrogen. This is a 120% improvement over the NaX zeolite and far greater than the 39% improvement in nitrogen adsorption capacity reported in the prior art for an 86% lithium-exchanged NaX.

The high lithium X has substantially higher nitrogen selectivity than low exchanged LiX also. The results of binary adsorption experiments in FIG. 2 show that 85% exchanged LiX has a separation factor of 4.2 in 1 atm air, at room temperature compared to 6.4 for a 94% exchanged LiX. The difference between LiX and NaX started to widen only after the lithium exchange level passed 85%.

More surprisingly, it has also been found that at 700 torr and room temperature, the nitrogen capacity of 99% exchanged LiX with silica to alumina ratio of 2.0 is 32% higher than the 99% exchanged LiX 2.5. This means that its nitrogen capacity is 250% higher than an 80% ion exchanged LiX 2.5 (Table I). At 0° C. 700 torr LiX 2.0 adsorbs 5.4 wt.% nitrogen as compared to 4.0 wt% for LiX 2.5 and 1.8 wt% for NaX.

It has also been discovered that LiX 2.0 have higher nitrogen selectivity than LiX 2.5 with the same lithium exchange level. As the data in FIG. 2 illustrates that at room temperature in 1 atm air mixture, the separation factor of LiX 2.0 is 11 as compared to 6.4 for LiX 2.5 and 3.2 for NaX.

A good PSA air separation adsorbent should have high delta loadings (the loading difference between the adsorption and desorption pressure in process cycles) and high nitrogen selectivity over oxygen at the pressure where adsorption occurs. In the case of the adsorbents of the present invention it has been found that they are especially useful in PSA adsorption processes operated at temperatures between about 15° C. and 70° C., preferably 20° C. and 50° C., and at pressures between about 50 torr and 10,000 torr.

What is claimed is:

1. Process for selectively adsorbing nitrogen from a gas mixture thereof with less polar substances which comprises contacting said gas mixture with a crystalline zeolite X adsorbent having a framework SiO$_2$/Al$_2$O$_3$ molar ratio of not greater than 3.0 and having at least 88 percent of its AlO$_2$ tetrahedral units associated with lithium cations.

2. Process according to claim 1 wherein the framework SiO$_2$/Al$_2$O$_3$ molar ratio of the zeolite X adsorbent is from 2.0 to 2.5.

3. Process according to claim 2 wherein the zeolite X adsorbent has at least 95 percent of its AlO$_2$ tetrahedral units associated with lithium cations.

4. Process according to claim 1 wherein the zeolite X adsorbent has at least 90 percent of its AlO$_2$ tetrahedral units associated with lithium cations.

5. Process according to claim 4 wherein the mixture of nitrogen with less polar substances consists essentially of nitrogen and oxygen.

6. Process according to claim 5 wherein the mixture of nitrogen and oxygen is contacted with the zeolite X adsorbent at a temperature of from 15° C. to 70° C. and at a pressure of 50 torr to 10,000 torr.

7. Process according to claim 6 wherein the temperature is from 20° C. to 50° C.

* * * * *